United States Patent [19]

Shannon et al.

[11] 4,440,869

[45] Apr. 3, 1984

[54] OLEFIN POLYMERIZATION CATALYST

[75] Inventors: Mark L. Shannon; Mark P. Mack, both of Ponca City, Okla.

[73] Assignee: Conoco Inc., Ponca City, Okla.

[21] Appl. No.: 429,632

[22] Filed: Sep. 30, 1982

[51] Int. Cl.$^3$ .......................... C08F 4/64; C08F 4/68; C08F 4/62

[52] U.S. Cl. .................................. 502/104; 502/117; 502/119; 502/133; 502/134; 502/125; 526/124; 526/125

[58] Field of Search ............ 252/429 B, 429 C, 431 R

[56] References Cited

U.S. PATENT DOCUMENTS 3,135,809 6/1964 Bosmajian ...................... 252/429 A
4,218,339 8/1980 Zucchini et al. ................ 252/429 B
4,374,755 2/1983 Berge et al. ..................... 252/431 R

*Primary Examiner*—Patrick Garvin
*Attorney, Agent, or Firm*—Cortlan R. Schupbach, Jr.

[57] ABSTRACT

High activity catalysts for the polymerization of ethylene and other α-olefins are made by contacting a soluble magnesium compound of the general formula Mg(O-SiR$_3$)$_2$, wherein each R is, independently, alkyl, alkoxy or aryl, with a titanium tetralkoxide (titanate) in a saturated aliphatic hydrocarbon solution, followed by chlorination and precipitation by a suitable chlorinating agent. These catalysts show high activity for the polymerization of ethylene under slurry polymerization conditions.

9 Claims, No Drawings

OLEFIN POLYMERIZATION CATALYST

This invention relates to a method for preparing catalysts having high activity for the polymerization of alpha olefins. More specifically, this invention relates to catalysts prepared by a method comprising contacting a soluble magnesium compound with a titanium tetraalkoxide in a saturated aliphatic hydrocarbon solution, followed by chlorination and precipitation by a suitable chlorinating agent. The method allows a fine control of atomic ratios within the catalyst, leading to high activity and reproducibility.

It has long been recognized that highly active olefin polymerization catalysts can be made by supporting a titanium chloride species on a magnesium halide or oxide species. In some cases suitable electron donating compounds have been used in such synthesis. Many of these procedures have suffered from being either lengthly or complex and further require extensive washings of the catalysts. These extensive washings can reduce catalyst efficiency through partial poisoning from impurities. Likewise, these procedures produce waste streams containing compounds which require purification before disposal or recycling.

Representative but non-exhaustive of the art in which silicon containing catalysts are made and used include U.S. Pat. No. 4,245,071 which utilizes trimethyl silanol materials and requires magnesium metal as a component. Washing steps are required, producing an insoluble catalyst which does not permit control of the various catalytic ratios to the extent desired.

U.S. Pat. No. 4,324,690 uses organosilicone as an electron donor by treating magnesium with polysiloxane. This method forms an insoluble catalyst which lacks catalytic ratio control. U.S. Pat. No. 3,987,233 uses silicon containing materials and halogenates immediately after the support is formed, resulting in a lack of control over catalytic ratios.

In U.S. Pat. No. 4,374,755 magnesium bis(siloxides) could be formed by a variety of methods and that such materials were useful as the support for forming olefin polymerization catalysts. However, this reference deals with magnesium bis(siloxides), including insoluble species and does not teach or suggest methods for achieving highest activity through atomic ratio control within the catalyst formed.

It would therefore be of great benefit to provide a catalyst having the advantages of high activity, while eliminating the need to washing detrimental catalyst residues from the polymer and which is prepared in a simple, efficient process.

It is therefore an object of the present invention to provide a method for obtaining a high activity olefin polymerization catalyst which is soluble in hydrocarbons through the preparation procedure and permits close control of atomic ratios within the catalyst species. The solubility of the reactants during preparation allows ease of handling in addition to atomic ratio control.

It is therefore an object of the present invention to provide a method for preparing highly active olefin polymerization catalysts. Other objects will become apparent to those skilled in this art as the description proceeds.

We have discovered that catalysts having high activity can be prepared by a process comprising contacting, in the substantial absence of a proton donor, a hydrocarbon soluble magnesium compound of the general formula $Mg(OSiR_3)_2$ with a transition metal tetraalkoxide of the general formula $M(OR^1)_4$ in a saturated aliphatic hydrocarbon solvent to form a solution, then forming a precipitate by chlorinating the solution in the substantial absence of free oxygen and recovering the precipitate for use as a catalyst, wherein each R is, independently, alkyl groups and alkoxy groups containing from 1 to about 20 carbon atoms and aryl groups, aryloxy groups, cycloalkoxy groups or cycloalkyl groups containing from 6 to 14 carbon atoms and wherein each $R^1$ is, independently, alkyl groups or etherically substituted alkyl groups containing from 1 to 20 carbon atoms, aryl groups, cycloalkyl groups or etherically substituted aryl groups or cycloalkyl groups containing from 6 to 14 carbon atoms and M is titanium, vanadium, chromium or zirconium. Titanium is preferred.

In preparing these catalysts, the magnesium bis(siloxide) compounds must be soluble in saturated aliphatic hydrocarbon solvent. Solubility in the hydrocarbon should be measured at temperatures of from −10° C. to about 100° C. and preferably from about 0° C. and about 40° C. In general, the test of soluble materials is one capable of forming a solution in a hexane, said solution having a strength of at least 0.01 molar (based on magnesium) at 25° C. However, other saturated aliphatic hydrocarbon solvents will also be useful. Representative but non-exhaustive examples of such solvents include n-pentane, n-octane, n-hexane, cycloheptane, cyclohexane, methylcyclohexane, isooctane, neopentane, and isomers, cogenors and mixtures of these materials.

Transition metal tetraalkoxides (or titanate) are compounds having the general formula $M(OR^1)_4$ wherein each $R^1$ group is, independently, alkyl, aryl, cycloalkyl, or etherically substituted alkyl, aryl, or cycloalkyl groups and M is titanium, chromium, vanadium and zirconium. Titanium is the preferred metal.

Representative but non-exhaustive examples of suitable titanates are isopropyl titanate, n-butyl titanate, phenyl titanate, di(isopropyl) bis(2-ethoxyethyl) titanate, tetramethyl titanate, tetracyclohexyl titanate, tetra-n-octadecyl titanate, di-iso-propyl (2-(2-n-dodecanoxyethoxy) ethyl) titanate. Analogous compounds of vanadium, chromium and zirconium can be used.

The transition metal titanates are used in molar ratios based on magnesium to titanium of from about 0.1 to 1 to about 500 to 1 respectively. Preferably, these materials are used at ratios of from about 0.5 to 1 to about 100 to 1 and the most preferred ratios are from about 2 to 1 to about 75 to 1 respectively. The invention is illustrated with respect to titanium.

The reaction between the hydrocarbon soluble magnesium bis(siloxides) and the titanium tetraalkoxides produce a solution. This reaction forms a soluble catalyst support material. The active catalyst is formed by chlorinating the solution in substantial absence of free oxygen to form a precipitate and recovering the precipitate for use as a catalyst. Suitable chlorinating agents are compounds of chlorine with a metal, organic group, or hydrogen. The chlorinating agent should preferably be a liquid, a gas or soluble in the saturated aliphatic hydrocarbon solvent.

The catalyst will contain chlorine to magnesium ratios ranging from about 1 to 1 to about 100 to 1 and preferably from about 2 to 1 to about 50 to 1 respectively. Representative but non-exhaustive examples of suitable chlorinating agents, are hydrogen chloride, ethylaluminum dichloride, silicon tetrachloride, carbon tetrachloride, boron trichloride, phosphorus trichloride, diethylaluminum chloride, ethylaluminum sesquichloride, $SnCl_4$, $HSiCl_3$, aluminum trichloride, ethylboron dichloride, diethylboron chloride, chloroform, $POCl_3$, acetyl chlorides, thionyl chloride, sulfur chloride, methyl trichlorosilane, dimethyl dichlorosilane, $TiCl_4$, $VCl_4$, and $VCl_5$. Of these diethylaluminum chloride and ethylaluminum dichloride are preferred.

The chlorinating step should be carried out in the substantial absence of free oxygen. Therefore, as is common with such catalysts, inert atmosphere should be used. Inert atmosphere can be nitrogen, argon, or any gas such as is non-reactive toward the reagents used or the reaction product. The gas should contain essentially no oxygen or water.

Once a precipitate has formed after chlorination, the precipitate can be recovered and used as a solid or added to a polymerization reaction as formed in a slurry. Use of the entire reaction mixture slurry as a catalyst is preferred.

Magnesium bissiloxides useful in the present invention are those soluble in a hydrocarbon as described. Representative but non-exhaustive examples of suitable materials are bis(butyl dimethyl siloxy)magnesium, bis(butyl methyl phenyl siloxy)magnesium, bis(butyl(2-ethyl-1-hexanoxy) methyl siloxy) magnesium, bis((n-hexyl)(2-ethyl-1-hexanoxy) methyl siloxy) magnesium, bis(di-n-hexyl methyl siloxy) magnesium, bis(methyl butyl (n-octadecanoxy) siloxy) magnesium, bis(methyl butyl (2-(2-n-dodecanoxyethoxy) ethoxy) siloxy) magnesium, and bis(n-hexyl dimethyl siloxy) magnesium.

The process of the present invention provides a simple, efficient and direct preparation of high activity polymerization catalysts. In addition, the activity can be maximized through careful control of atomic ratios within the process. This control is achieved by determining what ratios of reactants are added in each step of the procedure. Thus it is possible to closely control the atomic ratio desired, since reaction of each step is essentially complete.

Since the materials are all soluble until catalyst formation by chlorination, very homogenous reactions are obtained and no unreacted catalyst particles remain. Thus, substantially complete and even reaction through the catalyst is obtained allowing the high degree of control. Likewise, no waste streams are produced which must be purified, disposed or recycled. Further, the catalyst does not require washing and can be used as formed to provide a high activity material.

The invention is more concretely described with reference to the examples below wherein all parts and percentages are by weight unless otherwise specified. The examples are provided to illustrate the present invention and not to limit it.

EXAMPLE 1

A catalyst was prepared by placing one gram of $Mg(O(C_6H_5)Si(CH_3)(C_4H_9))_2$ (2.43 mmol) in 2.00 milliliters (ml) of dry degassed cyclohexane, under an argon atmosphere in a reactor and adding 43 microliters (0.046 g, 0.135 mmol) of $Ti(OC_4H_9)_4$ to form a solution. This solution was stirred for 1.0 hour, and then 2.42 g of a 25.5 wt% solution of ethylaluminum dichloride (4.87 mmol) in heptane was added dropwise at room temperature giving a pale purple-gray powder in cyclohexane-heptane slurry. The slurry was diluted to 10 ml with dry, degassed hexane. A 5.00 ml aliquot of the slurry was diluted to 20.00 ml with additional dry, degassed hexane for use in polymerization. Analysis of this diluted slurry showed concentrations of: Mg = 1.6 mg/ml, Ti = 0.18 mg/ml, and Al = 3.7 mg/ml for an atomic ratio of Mg/Ti/Al = 17.9:1.0:37.9.

EXAMPLE 2

The recovered catalyst was utilized as a slurry in the an ethylene polymerization. A 1.7 liter stainless steel autoclave was used for polymerization, wherein 600 ml of dried hexane was saturated with ethylene by repeatedly pressurizing the autoclave to 120 pounds per square inch gauge (psig) with ethylene and venting to 10 psig at 40° C. After saturation, 0.80 ml of a 25% solution of triethylaluminium in heptane and 0.50 ml of the catalyst slurry (0.090 mg as Ti) was added to the reactor. The reactor was pressurized to 55 psig with hydrogen (giving a net partial pressure of 45 PSIG hydrogen), and to 90 psig with ethylene. The reactor was quickly heated to 85° C. and ethylene was added continuously at this temperature at a 120 psig line pressure. After 1.0 hours, the reaction was terminated. The reaction yielded 145.08 g of polyethylene, (density = 0.9618, $MI_2 = 3.19$, $MI_{20/2} = 34.48$) or 1610 Kg PE/g Ti-Hr.

EXAMPLES 9-10

Subsequent polymerizations with the identical catalyst were carried out exactly as described in Example 2, but the partial pressure of hydrogen was varied. The results of these examples and the molecular weight distribution as described by melt index is set forth in Table 1.

TABLE 1

| Ex | psig $H_2$ | Kg PE/ g Ti-Hr | density | $MI_2$ | $MI_{20/2}$ |
|---|---|---|---|---|---|
| 2 | 45 | 1610 | 0.9618 | 3.19 | 34.48 |
| 3 | 45 | 1630 | 0.9683 | 2.69 | 38.29 |
| 4 | 45 | 1700 | 0.9630 | 3.38 | 32.25 |
| 5 | 30 | 2380 | 0.9602 | 0.836 | 34.33 |
| 6 | 30 | 2620 | 0.9588 | 0.644 | 30.90 |
| 7 | 15 | 3400 | 0.9546 | 0.112 | 33.75 |
| 8 | 15 | 3720 | 0.9534 | 0.099 | 32.53 |
| 9 | 0 | 5790 | 0.9495 | 0.000 | — |

COMPARATIVE EXAMPLE 11

In a 30 ml serum vial, under an inert atmosphere, 2.21 ml of a 0.602 M solution, in hexane, of dibutylmagnesium (1.33 mmole) and 0.64 g of triethylsilanol (4.84 mmole) were allowed to react and formed a non-soluble slurry. When the product slurry (in hexane) was cool, 2 ml of fresh, dry cyclohexane was added dropwise.

To this slurry was added 33.3 microliters (0.097 mmol) of tetra-n-butyltitanate was added and the resultant slurry stirred for 1 hour. After this period, 2.42 g of a 25.5 wt. % solution of ethylaluminum dichloride in hexane (4.86 mmole as EADC) was added dropwise. The final catalyst slurry was then diluted to 25 ml final volume with more cyclohexane. Analysis showed concentrations of Al = 5.60 mg/ml, Mg = 1.28 mg/ml, Ti = 0.18 mg/ml, for molar ratios of Al/Mg/Ti = 54.03/13.71/1.00.

COMPARATIVE EXAMPLE 12

A catalyst was prepared by closely following the procedure outlined above and using the same reagents in similar amounts. Slower addition of the dibutylmagnesium to a dilute solution of the triethylsilanol in cyclohexane and addition of the ethylaluminum dichloride in parts yielded a catalyst with a more uniform distribution of particle size. Analysis showed concentrations of Al=5.07 mg/ml, Mg=1.56 mg/ml, and Ti=0.35 mg/ml, for molar ratios of Al/Mg/Ti=25.63/8.76/1.

COMPARATIVE EXAMPLES 13-20

Ethylene polymerizations were carried out using the same procedure but with differing partial pressures of hydrogen. In a 1.7 stainless steel autoclave, 600 ml of dried hexane was saturated with ethylene by repeatedly pressurizing the autoclave to 120 psig with ethylene and venting to 10 psig at 40° C. To this was added 0.8 ml of a 25° solution of triethylaluminum in heptane and 0.5 ml of the catalyst slurry from comparative Example 11 (0.093 mg as Ti). The reactor was pressurized to 55 psig with hydrogen, and to 90 psig with ethylene. The reactor was quickly heated to 85° C. and ethylene was added continuously at this temperature at a 120 psig line pressure. After 1.0 hr., the reaction was stopped and yielded 75.12 g of polyethylene, (density=0.9619, $MI_2$=0.940, $MI_{20/2}$=39.15) or 854.7 Kg PE/g Ti-Hr. Results are set forth in Table 2.

TABLE 2

| Comp Ex | Catalyst | PSIG $H_2$ | KgPe/Ti-hr. | $MI_2$ | $MI_{20/2}$ | density |
|---|---|---|---|---|---|---|
| 13 | Comp Ex 11 | 45 | 834.7 | 0.940 | 39.15 | 0.9619 |
| 14 | Comp Ex 11 | 30 | 1479 | 0.280 | 37.14 | 0.9570 |
| 15 | Comp Ex 11 | 15 | 2030 | 0.065 | 31.69 | 0.9530 |
| 16 | Comp Ex 11 | 0 | 4184 | 0.000 | — | 0.9431 |
| 17 | Comp Ex 12 | 45 | 1518 | 2.34 | 35.21 | 0.9624 |
| 18 | Comp Ex 12 | 30 | 2080 | 0.494 | 35.83 | 0.9571 |
| 19 | Comp Ex 12 | 15 | 1983 | 0.067 | 36.72 | 0.9543 |
| 20 | Comp Ex 12 | 0 | 2912 | 0.000 | — | 0.9543 |

Molecular weight distribution was determined using the ratio $MI_{20}/MI_2$, where the result indicated the relative distribution, as described by Nielson in Polymer Rheology, (1977) Marcel Dekker Pub., New York pp 69–75. In this determination, $I_2$ is the melt index as determined by ASTM D-1238, Condition E, and $I_{20}$ as determined by ASTM D-1238, Condition F.

While certain embodiments and details have been shown for the purpose of illustrating this invention, it will be apparent to those skilled in this art that various changes and modifications may be made herein without departing from the spirit or scope of the invention.

We claim:

1. A method for preparing catalysts for polymerization of alpha-olefins comprising contacting, in substantial absence of proton donor, a soluble magnesium compound of the general formula
Mg(OSiR$_3$)$_2$ with transition metal tetraalkoxide of the general formula M(OR$^1$)$_4$ in a saturated aliphatic hydrocarbon solvent to form a solution, then forming a precipitate by chlorinating the solution in the substantial absence of free oxygen and recovering the precipitate for use as a catalyst, wherein each R is, independently, alkyl groups or alkoxy groups containing from 1 to about 20 carbon atoms or aryl, aryloxy groups, cycloalkoxy groups or cycloalkyl groups containing from 6 to 14 carbon atoms and each R$^1$ is independently, alkyl groups or etherically substituted alkyl groups containing from 1 to 20 carbon atoms, aryl, cycloalkyl or etherically substituted aryl or cycloalkyl groups containing from 6 to 14 carbon atoms and M is titanium, vanadium, chromium or zirconium.

2. A method as described in claim 1 wherein M is titanium.

3. A method as described in claim 2 wherein the solution is chlorinated with a compound containing chlorine bonded to hydrogen, metal, or organic groups.

4. A method as described in claim 3 wherein the chlorinating agent is selected from the group consisting of hydrogen chloride, ethylaluminum dichloride, silicon tetrachloride, carbon tetrachloride, boron trichloride, phosphorus trichloride, diethylaluminum chloride, ethylaluminum sesquichloride, SnCl$_4$, HSiCl$_3$, aluminum chloride, ethylboron dichloride, boron chloride, diethylboron chloride, chloroform, phosphorus oxytrichloride acetyl chlorides, thionyl chloride, sulfur chloride, methyl trichlorosilane, dimethyl dichlorosilane, titanium tetrachloride, vanadium tetrachloride and vanadium pentachloride.

5. A method as described in claim 4 wherein the soluble magnesium compound is a magnesium bissiloxide selected from the group consisting of bis(butyl dimethyl siloxy) magnesium, bis(butyl methyl phenyl siloxy) magnesium, bis(butyl (2-ethyl-1-hexoxy) methyl siloxy) magnesium, bis((n-hexyl) (2-ethyl-1-hexoxy) methyl siloxy) magnesium, bis(di-n-hexyl methyl siloxy) magnesium, bis(methyl butyl (n-octadecanoxy) siloxy magnesium, bis(methyl butyl (2-(2-n-dodecanoxyethoxy) ethoxy) siloxy) magnesium, and bis(n-hexyl dimethyl siloxy) magnesium.

6. A method as described in claim 5 wherein the titanium tetraalkoxide compound is selected from the group consisting of isopropyl titanate, n-butyl titanate, phenyl titanate, di(isopropyl) bis(2-ethoxyethyl) titanate, tetramethyl titanate, tetracyclohexyl titanate, tetra-n-octadecyl titanate and di-isopropyl (2-(2-n-dodecanoxyethoxy)ethyl) titanate.

7. A method as described in claim 6 wherein the mole ratio of chlorine to magnesium is from about 1:1 to about 25:1, respectively.

8. A method as described in claim 7 wherein the mole ratio of magnesium to titanium is from about 0.5 to 1 to 75:1, respectively.

9. A method as described in claim 8 wherein the saturated aliphatic hydrocarbon is selected from the group consisting of n-pentane, n-octane, n-hexane, cycloheptane, cyclohexane, methyl cyclohexane, isooctane, neo-pentane, petroleum ether and isomers, mixtures and cogenors thereof.

* * * * *